United States Patent [19]

Service et al.

[11] Patent Number: 5,694,541
[45] Date of Patent: Dec. 2, 1997

[54] SYSTEM CONSOLE TERMINAL FOR FAULT TOLERANT COMPUTER SYSTEM

[75] Inventors: John D. Service, Chelmsford; Walter A. Jones, Jr., Carlisle; Richard Urmston, Westboro; Arthur J. Beaverson, Boxborough; Charles J. Horvath, Concord; Matthew A. Trask, Bourne; John T. Vachon, Taunton; Jeffrey D. Carter, Bedford, all of Mass.

[73] Assignee: Stratus Computer, Inc., Marlboro, Mass.

[21] Appl. No.: 546,347

[22] Filed: Oct. 20, 1995

[51] Int. Cl.⁶ .................................................. G06F 15/02
[52] U.S. Cl. .................................. 395/183.22; 395/184.01
[58] Field of Search ............................ 395/183.22, 650, 395/200.01, 200.1, 182.09, 185.06, 185.02, 184.01, 182.1; 364/188

[56] References Cited

U.S. PATENT DOCUMENTS

| | | | |
|---|---|---|---|
| 4,720,782 | 1/1988 | Kovalcin | 364/188 |
| 5,247,517 | 9/1993 | Ross et al. | 370/85.5 |
| 5,315,711 | 5/1994 | Borone et al. | 395/200.1 |
| 5,347,646 | 9/1994 | Hirosawa et al. | 395/85.02 |

*Primary Examiner*—Robert W. Beausoliel, Jr.
*Assistant Examiner*—Ly V. Hua
*Attorney, Agent, or Firm*—Richard A. Jordan

[57] ABSTRACT

A console terminal arrangement is disclosed for use in connection with a fault-tolerant computer system including a plurality of processing modules, at least some of the processing modules including an operator input/output interface for receiving operator input from an operator input device and operator display output on an operator display device. The console terminal arrangement facilitates management of all of the processing modules by a single operator from a single location. The arrangement includes a console terminal and a plurality of processing module interfaces interconnected by a network. The console terminal includes an operator input device and an operator display device, and generates operator input messages including processing module management information generated by the operator input device in response to inputs provided by an operator and an address identifying one of the processing modules to be managed by the console terminal. The console terminal further generates and displays video images in response to video image data received in messages from the processing modules. Each processing module interface receives operator input messages generated by the console terminal which include an address identifying the processing module connected to the processing module interface and provide the processing module management information to the operator input/output interface to control the processing module. In addition, each processing module interface receives video information from the associated processing module's operator input output device and generates a message including the video information and an address identifying the console terminal. The network carries messages generated by the console terminal and the processing module interfaces in accordance with the addresses contained in the respective messages.

20 Claims, 1 Drawing Sheet

SYSTEM CONSOLE TERMINAL FOR FAULT TOLERANT COMPUTER SYSTEM

INCORPORATION BY REFERENCE

U.S. patent application Ser No. 08/46,234, filed on even date herewith, in the name of David A. Utter, et al., and entitled Distributed Fault Tolerant Digital Data Storage Subsystem For Fault Tolerant Computer System, (Atty. Docket No. STR-003), incorporated herein by reference.

FIELD OF THE INVENTION

The invention relates generally to the field of digital computer systems, and more particularly to a console terminal subsystem for use in connection with a computer system for enabling a system administrator or other operator to determine the operating status of the computer system and control its operations.

BACKGROUND OF THE INVENTION

Digital computer systems are used in a number of applications in which virtually continuous, error free operation is important to the operation of businesses or other entities using the systems. For example, in banking, computer systems are used to maintain account information and update account balances, and it is important for a bank to be able to provide accurate and up-to-date account information virtually instantaneously. Similarly, computers are used to monitor and control of airplane traffic, and around crowded airports and along major air corridors, it is vital that the computers be configured so that the air traffic control systems are continuously available. Computers are also used to control switching systems for the public telephone system, and it is similarly important that the computers be configured provision be made so that the telephone systems be continuously available.

It is generally possible to build computer systems which have extremely reliable components to accomplish tasks such as these and numerous others, and to provide preventive maintenance in such a way and with such frequency that failures are extremely improbable. However, such high-reliability computer systems would be extremely expensive to build and maintain. Accordingly, "fault-tolerant" computer systems have been developed, which is generally designed with the expectation that one or more element of the system may fail at some point in its operation, but that if an element does fail, other elements are available to detect the failure and ensure that the system will continue to give proper results. Such fault-tolerant computer systems will generally be much less expensive to build and maintain, since they may be constructed of components which individually are of lower reliability than those of high-reliability computer systems, and thus would cost less to build, and maintenance costs would also be lower. Fault-tolerant computer systems generally include redundant components which operate in parallel, and when a fault is detected in one element the other components are available to continue operation. A number of schemes may be used to detect a fault, such as fault detection circuitry which can detect certain types of faults. In addition, if a fault-tolerant system includes at least, for example, three processing components operating in parallel, the system can compare outputs of the three components and, if the outputs of two of the processing components agree but the output the third processing element differs from that of the other two, the system can with a high degree of confidence draw the inference that the one processing component is faulty and its output should be ignored and that the outputs from the two processing components which agree with each other are correct and should be used.

With the decreasing cost and increasing functionality of commodity components, such as conventional personal computer module (generally termed a personal computer "motherboard") used in personal computers, which include a microprocessor, a main memory, mass storage interfaces and operator input/output interfaces, it is cost-effective to use such modules in fault-tolerant computer systems. To provide fault-tolerance in such a system, it would be necessary to include a number of such modules in the fault-tolerant computer system. However, problems arise in using conventional personal computer modules, in particular relating to system management. Typically, a system manager will monitor the status and manage the operations of a computer system, and may also establish operating parameters. In a system including a number of personal computer modules, each of the modules will have to be separately monitored. However, personal computer modules are designed with the expectation that each will be connected to separate operator input/output devices, such as keyboards, mice and video display devices, and providing separate devices for each personal computer module would be expensive and may be confusing for the operator.

SUMMARY OF THE INVENTION

The invention provides a new and improved console subsystem for use in connection with a computer system, such as a fault-tolerant computer system or other computer system including a plurality of processing nodes, for enabling a system administrator or other operator to determine the operating status of the computer system and control its operations.

In brief summary, the invention provides a console terminal arrangement for use in connection with a fault-tolerant computer system including a plurality of processing modules, at least some of the processing modules including an operator input/output interface for receiving operator input from an operator input device and operator display output on an operator display device. The console terminal arrangement facilitates management of all of the processing modules by a single operator from a single location. The arrangement includes a console terminal and a plurality of processing module interfaces interconnected by a network. The console terminal includes an operator input device and an operator display device, and generates operator input messages for transmission over a network, the messages including processing module management information generated by the operator input device in response to processing module management inputs provided by an operator and an address identifying one the processing module to be managed by the console terminal. The console terminal further generates video image information in response to video image data received thereby in video information messages from the processing module to be managed by the console terminal. Each processing module is connected to a processing module interface. Each processing module interface receives operator input messages generated by the console terminal which include an address identifying the processing module connected to the processing module interface and providing the processing module management information to the operator input/output interface to thereby facilitate control of the processing module. In addition, each processing module interface receives video information from the operator input output device of its associated processing module, and generates a message including the video information and an address identifying the console terminal. The network connects the console terminal to all of the processing module interfaces and carries messages generated by the console terminal and the processing module interfaces thereamong in accordance with the addresses contained in the respective messages.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
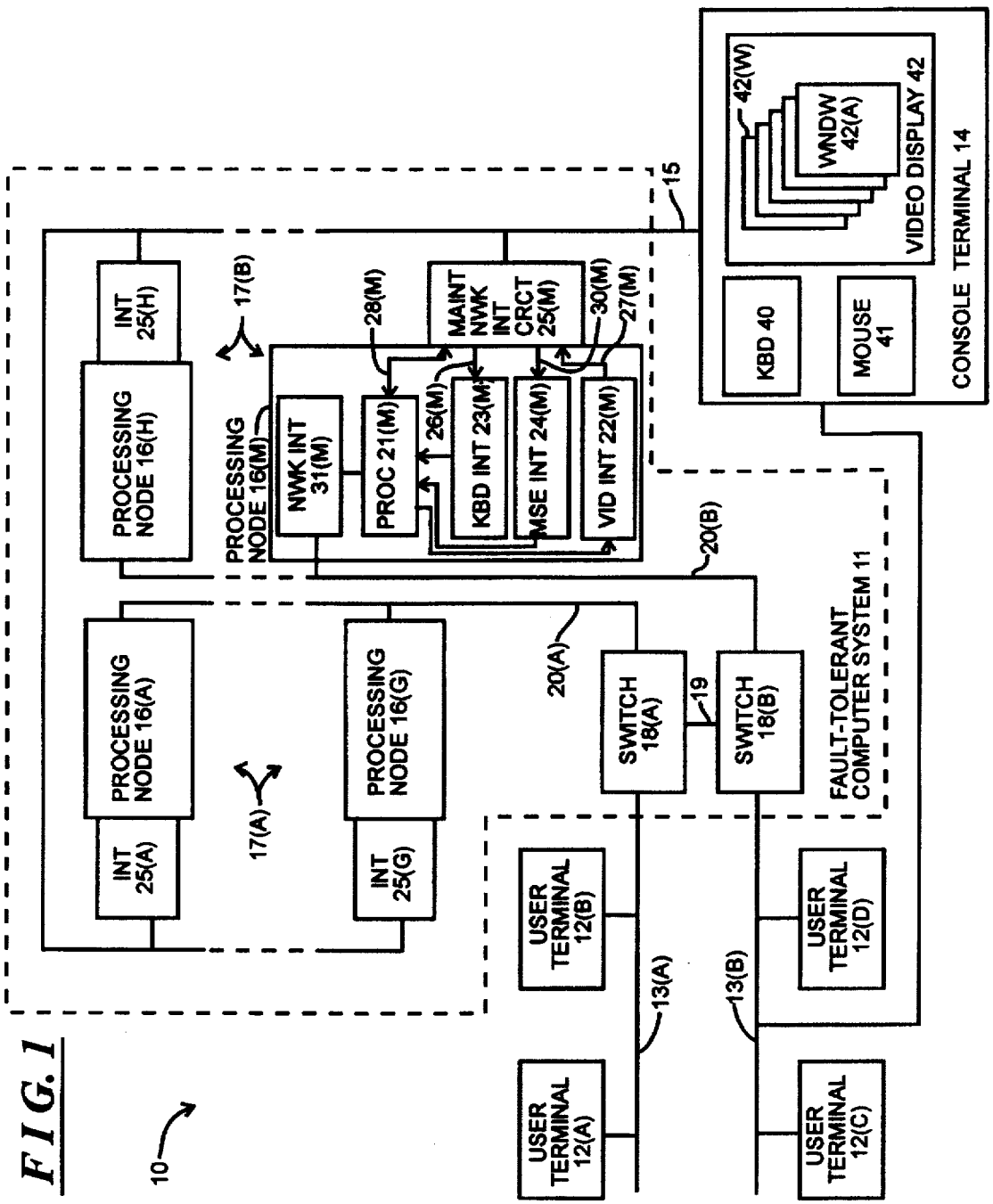
FIG. 1 is a functional block diagram of a digital computer system including a console terminal subsystem constructed in accordance with the invention.

FIG. 1 is a functional block diagram of a digital computer system 10 including a console subsystem that is constructed in accordance with the invention. With reference to FIG. 1, the digital computer system 10 includes a fault-tolerant computer system 11 which connects to a plurality of user terminals 12(A) through 12(D) (generally identified by reference numeral 12(d)) over respective networks 13(A) and 13(B) (generally identified by reference numeral 13(n)) which connect the user terminals 12(d) to the fault-tolerant computer system 11. The fault-tolerant computer system 11 performs conventional digital data processing and data retrieval and storage services that are generally typical of those performed by digital computer systems, in connection with processing, data retrieval and data storage requests provided thereto by the user terminals 12(d) and, as will be described below in greater detail, includes a number of subsystems which allow the services to be provided in a manner which is tolerant of faults and malfunctions therein. The digital computer system 10 further includes a console terminal 14, which may connect to the fault-tolerant computer system 11 in two ways, namely, through network 13(A) and over a console network 15.

In addition to transferring requests from the user terminals 12(d) to the fault-tolerant computer system 11, the networks 13(n) may also transfer data from the fault-tolerant computer system 11 to the user terminals 12(d) for local processing by the user terminals 12(d) or display to a user. In addition, the networks 13 (n) may transfer data from the user terminals 12(d) to the fault-tolerant computer system 11 for processing or storage as described above, and in addition may transfer data among the user terminals 12(d).

The user terminals 12(d) used in the digital computer system 10 may comprise any of a number of devices which may be provided to enable the fault-tolerant computer system 11 to operate to perform data storage and processing operations. The detailed structure of the user terminals 12(d) will be generally determined by the specific types of processing to be performed by the digital computer system 10, and will not be described in detail. For example, in connection with a digital computer system 10 which may be used in, for example, a transaction processing system in a financial institution such as a bank or the like, the user terminals may include conventional video display terminals or personal computers which include a keyboard through which a user may enter transaction data, a video display device which may display processed transaction data to a user, and may also include processing circuits for performing local processing. In connection with a digital computer system 10 used in controlling an industrial facility such as a factory, the user terminals 12(d) may also comprise video display terminals or personal computers which may enable an operator to control the facility as well as interfaces to the machines and the like that are used in the facility to control operations by the machines. In addition, in connection with a digital computer system 10 used in controlling operations of, for example, a telephone switching operation, at least some of the user terminals 12(d) may control operation of the telephone switching circuits to ensure that voice information is properly routed through the telephone system between the calling and called parties.

In one embodiment, the networks 13(A) and 13(B) are each in the form of conventional high-speed (100 Mb/second) Ethernet networks, which transfer information in the form of messages. As is conventional in Ethernet networks, messages generated by one device connected to a network 13(A), 13(B) (that is, by a user terminal 12(d) or by the fault-tolerant computer system 11) contain information to be transferred, as well as an address which identifies the intended recipient or recipients of the information.

As noted above, the fault-tolerant computer system 11 includes a number of subsystems which allow the services to be provided in a manner which is tolerant of faults and malfunctions. In particular, the fault-tolerant computer system 11 includes a number of processing nodes 16(A) through 16(M) (generally identified by reference numeral 16(m) which are divided into two sections 17(A) and 17(B) (generally identified by reference numeral 17(s), with processing nodes 16(m)) in each section 17(s) being connected to a respective switch 18(A) and 18(B) (generally identified by reference numeral 18(h) over a respective network 20(A) and 20(B) (generally identified by reference numeral 20(k). As with networks 13(n), networks 20(A) and 20(B) are each in the form of conventional high-speed (100 Mb/second) Ethernet networks, which transfer information in the form of messages, with each generated by a device connected to a network 20(k) (that is, by a processing node 16(m) or switch 18(h) containing information to be transferred, as well as an address which identifies the intended recipient or recipients of the information.

The switches 18(h) for the two sections 17(s), in turn, are interconnected by a link 19, and each switch 18(h) is connected to one of the networks 13(A) or 13(B). The processing nodes 16(m) perform the data processing and storage services for the user terminals 12(d) as described above in connection with the fault-tolerant computer system 11, and the networks 13 (n), switches 18(h) and networks 20(k) serve to transfer each processing and storage request from the user terminals 12(d) to processing nodes 16(m) which are to execute the request and return any data and status information that is to be returned from the processing nodes 16(m) executing the request to the user terminals 12(d). The switches 18(A) and 18(B) control communication between networks 13(A) and 13(B), on the one hand, and the networks 20(A) and 20(B), on the other hand. In addition, the switches are interconnected to transfer processing and/or storage requests and returned data and storage information from devices connected to networks 13(A), 20(A) or 13(B), 20(B) that are connected to one switch 18(A), 18(B) to devices connected to networks 13(B), 20(B) or 13(A), 20(A) that are connected to the other switch 18(B), 18(A). Storage and processing requests are routed to specific processing nodes 16(m) for processing by the specific nodes while they are functioning properly; however, if a malfunction occurs in a node to which a request is directed, requests normally directed to the malfunctioning node may be directed to other processing nodes for processing, thereby to provide fault-tolerant service to the user terminals 12(d).

In one embodiment, each processing node 16(m) is in the form of a conventional personal computer module (generally termed a personal computer "motherboard"), in particular processing circuitry 21(m) including a microprocessor and a main memory including both a read/write random-access ("RAM") memory used for the operating system program and applications programs and a read-only memory ("ROM") for storing initialization routines and basic input/output system ("BIOS") routines. In that embodiment, the processing nodes 16(m) utilize the Microsoft Windows-™ operating system program as the operating system program. The initialization routines are used to initialize the processing node 16(m) during power-up of the personal computer module and in response to a re-initialization request from the console terminal 14 as will be described below. In addition, the personal computer module includes a disk controller interface which may facilitate connection to a disk storage subsystem (not shown). The personal computer module further includes a video display interface 22(m), a keyboard interface 23(m) and a mouse port interface 24(m) which, if the personal computer module were connected in a personal computer, would be connected to a video display, a keyboard and a mouse, respectively, to provide a visual output (in video form) to an operator (in the case of the video display) and to receive operator input (in the case of the keyboard and mouse).

In addition, the personal computer module includes a network interface 31(m) which connects the processing node 16(m) to the network 20(k) to enable the processing node to receive processing and storage requests and to transmit processed data over the network 20(k). In addition, the network interface 31(m) will enable the processing node 16(m) to receive information from the console terminal 14, and to transmit information thereto, over in messages over network 20(k).

The personal computer module may also include a number of other elements, including conventional serial and parallel ports and one or more "slots" which permit connection of expansion modules, in the form of printed circuit boards, to the personal computer module over a bus, which may comprise, for example, a conventional EISA, MCI, PCI, or other bus (not shown).

The console terminal 14 provides console services to the fault-tolerant computer system 11. In particular, an operator or system manager may, through the console terminal 14 over maintenance network 15, monitor and control initialization of one or more of the various processing nodes 16(m), individually, as the processing nodes 16(m) are powered-up. In addition, the operator or system manager may, in response to a re-initialization request from the console terminal 14 over either maintenance network 15 or network 13(A), initiate re-initialization of an individual processing node 16(m) after the processing node has been powered-up. Furthermore, the operator or system manager may, through the console terminal 14 over maintenance network 15 or the network 13(A), establish operating parameters by each processing node 16(m) by establishing initialization scripts to be processed by the processing node 16(m) to enable the processing node to execute selected node "system configuration" commands, load selected device drivers and the like. The operator or system manager may, while the processing nodes 16(m) are operating, use the console terminal 14 to retrieve and view video output that is generated by individual processing nodes 16(m) to determine their operational status. It will be appreciated that, while the maintenance network 15 will likely be local to the fault-tolerant computer system 11, the networks 13(k) may extend to locations such as offices or the like, which my be quite remote from the fault-tolerant computer system 11, and allowing the console terminal 14 to provide console services to the fault-tolerant computer system over a network 13(k) may permit the operator to conveniently control and monitor the fault-tolerant computer system 11 after power-up from such a remote location.

In one embodiment, the console terminal 14 is in the form of a conventional personal computer or workstation, which includes conventional data processing and data storage elements and a network interface to connect the console terminal to the maintenance network 15 (not separately shown). In addition, the console terminal 14 includes user input devices, including a keyboard 40, through which a user, such as an operator or system administrator, may input textual information, and a mouse 41 by which the user can manipulate the location of a mouse pointer. The console terminal 14 also includes user output devices, including a video display device 42 for displaying information in video form, including information input by the user and also the location of the mouse pointer. The console terminal 14 may also include a printer (not shown) for printing information in hardcopy form. The console terminal 14 displays the video information on the video display device in one or more windows 42(A) through 42(W) (generally identified by reference numeral 42(w)), which may, for example, be associated with various applications programs being processed by the console terminal 14; in such an arrangement, one window is selected as an active window, either by suitable manipulation of the mouse pointer or by suitable keystroke combinations through the keyboard 40, and textual information provided by the operator through the keyboard 40 will be provided to the applications program whose window 42(w) is the current active window. In one embodiment, the console terminal 14 uses a windowing operating system program such as the Microsoft Windows™ operating system program to provide a windowing environment, although it will be appreciated that other windowing operating system programs may be used.

In one embodiment, maintenance network 15 is in the form of a conventional low-speed (10 Mb/second) Ethernet network. As with the high-speed Ethernet network described above, the low-speed Ethernet network transfers information in the form of messages, with each message that is generated by a device that transmits information over the network 15 (that is, the console terminal 14 or the processing nodes 16(m) containing the information to be transferred, as well as an address which identifies the intended recipient or recipients of the information. To enable the console terminal 14 to communicate with the processing nodes 16(m) over the maintenance network 15, each processing node 16(m) includes a maintenance network interface circuit 25(m), which actually connects to the maintenance network 15 and generates and transmits and receives messages thereover. The maintenance network interface circuit 25(m) comprises an expansion module connected in a slot on the respective processing node 16(m). The maintenance network interface circuit 25(m), includes, among other things, a maintenance network connection circuit (not separately shown) for transmitting and receiving messages over the maintenance network 15, an keyboard redirection circuit, represented by the arrow identified by reference numeral 26(m), a video data access circuit, represented by the arrow identified by reference numeral 27(m), a mouse port redirection circuit, represented by the arrow identified by reference numeral 30(m). The keyboard redirection circuit 26(m) provides keystroke information received by the maintenance network interface circuit 25((m) over the maintenance network 15 to the keyboard interface 23(m) which conforms to keystroke information which would be provided by a keyboard if the keyboard were connected to the keyboard interface 23(m). Similarly, the mouse port redirection circuit 30(m) provides mouse location and displacement information as well as mouse button depression and release information to the mouse port interface 24(m) which conforms to the information which would be provided by a mouse if the mouse were connected to the mouse port interface 24(m). The video data access circuit 27(m) retrieves video data from the processing node's video interface 22(m), which conform to video information which would be displayed by a video display if the video display were connected to the video interface 22(m). The video interface 22(m) can provide video information in both ASCII text and bit-mapped graphical form, and the video data access circuit 27(m) retrieves the video information in both forms. In addition, the maintenance network interface circuit 25(m) includes a processor connection 28(m) to permit direct communications between the interface circuit 25(m) and the processor 21(m). In one embodiment, the maintenance network interface circuit 25(m) comprises a Server Monitor Module sold by Intel Corporation, operating under control of a suitable program as described below, and the maintenance network connection circuit comprises a PCMCIA Ethernet interface device which connects to a PCMCIA interface provided by the server monitor module.

The maintenance network interface circuit 25(m) that is associated with a processing node 16(m) uses the maintenance network connection circuit to transmit messages over the maintenance network 15 and receive messages from the maintenance network 15. The processor 21(m) may, over connection 28(m), enable the maintenance network interface circuit 25(m) to transmit messages over the maintenance network 15. In addition, the maintenance network interface circuit 25(m) may transmit messages over the maintenance network 15 independently of the processor 21(m), which may include, for example, video information from the video interface 22(m), which it retrieves through the video data access circuit 27(m).

The messages received by the maintenance network interface circuit 25(m) over maintenance network 15 may be generated by other maintenance network interface circuits, in which case they may contain information generated by other processing nodes. In addition, the messages received by the maintenance network interface circuit 25(m) may be generated by the console terminal 14 and transmitted directly thereto over maintenance network 15. Messages received by the maintenance network interface circuit 25(m) may include commands which enable it to perform a number of types of operations. If, for example, a message includes a command to provide information contained in the command to the processor 21 (m) for processing, the maintenance network interface circuit 25(m) will provide the information in the message to the processor 21(m) over connection 28(m). If, alternatively, a message received over the maintenance network 15 includes a command that information to be transmitted over the network 20(k), the maintenance network interface circuit 25(m) may also provide the information to the processor 21(m), which, in turn, will enable the network interface 31 (m) to transmit the information over the network 20(k). On the other hand, if a message includes a command to provide information in the message to the keyboard interface 23(m) or mouse interface 24(m) as keystroke information or mouse movement information, respectively, the maintenance network interface circuit 25(m) will provide information received in the message to the keyboard interface 23(m) or mouse interface 24(m) through the keyboard redirection circuit 26(m) or mouse redirection circuit 30(m). In addition, if a message includes a command to return video information over the maintenance network 15, the maintenance network interface circuit 25(m) will use the video data access circuit 27(m) to retrieve video information from the video interface 22(m), and will transmit the requested video information in one or more messages over the maintenance network 15.

In addition, the maintenance network interface circuit 25(m) may generate and transmit messages over the maintenance network 15 to maintenance network interface circuits 25(m') which are associated with other processing nodes 16(m'), including messages which indicate the operational status of its associated processing node 16(m). By use of such messages, maintenance network interface circuits 25(m) of each of the processing nodes 16(m) will be apprised of the operational status of its processing node 16(m) as well as of all of the other processing nodes 16(m).

As described above, the console terminal 14 will preferably use the maintenance network 15 during initial power-up of the fault-tolerant computer system 11 and will thereafter use the network 13(n) for it monitoring and other operations. In initializing the processing nodes 16(m), both during the initial power-up of the fault-tolerant computer system 11, as well as after the initial power-up, each of processing nodes 16(m) may generally be initialized separately of the other processing nodes, and so the console terminal 14 may, on power-up, initialize only one of the nodes over the maintenance network 15, and thereafter initialize the other processing nodes 16(m) over the network 13(n). On the other hand, the console terminal 14 may, on power-up, initialize all of the processing nodes 16(m) over the maintenance network 15. In any case, after the fault-tolerant computer system 11 has been powered-up, the console terminal 14 may perform its monitoring and other operations over a network 3(n).

In using the maintenance network 15 during the initial power-up, the console terminal 14 will generate messages for transmission over the maintenance network 15 to the maintenance network interface circuit 25(m) at least one processing node 16(m), and in addition will receive messages from the maintenance network interface circuit 25(m) of the processing node 16(m) over the maintenance network 15. At least some of the messages transmitted by the console terminal 14 during initial power-up will contain keyboard and mouse movement information to enable an operator, through the console terminal, control the initialization process, and, as described above, the maintenance network interface circuit 25(m) will provide the keyboard and mouse movement information to the respective interfaces 23(m) and 24(m) through the keyboard and mouse port redirection circuits 26(m) and 30(m). In addition, during initial power-up the console terminal 14 will, by means of a command directed to the maintenance network interface circuit 25(m) of the processing node 16(m) being initialized, enable the maintenance network interface circuit 25(m) to retrieve video data from the video interface 22(m) through the video redirection circuit 27(m) and provide it to the console terminal 14 in messages transmitted over the maintenance network 14.

After the initialization of at least one processing node 16(m) during power-up, the console terminal 14 may use the network 13(n) to initialize the remaining processing nodes in the fault-tolerant computer system 11. In addition, in its monitoring and other operations in connection with the processing nodes 16(m) of the fault-tolerant computer system 11 after power-up, the console terminal may use the network 13(n). In those operations, the console terminal 14 may effectively communicate with one of the processing nodes 16(m) over the network 13(n). However, when the a processing node, such as a processing node 16(I) ("I" being an index between "A" and "M"), requires initialization, the console terminal 14 may select one of the processing nodes, such as processing node 16(M), and, by means of messages transmitted over the network 13(n) and received by the processing node 16(M), enable the maintenance network interface circuit 25(M) of processing node 16(M) to transmit and receive messages over the maintenance network 15 to initialize the processing node 16(I). As during initialization during power-up, at least some of the messages transmitted by the processing node 16(M) to processing node 16(I) over the maintenance network 15, in response to messages transmitted over the network 13 (n) by console terminal 14, may contain keyboard and mouse movement information to enable an operator, through the console terminal, control the initialization process, and, as described above, the maintenance network interface circuit 25(I) will provide the keyboard and mouse movement information to the respective interfaces 23(I) and 24(I) through the keyboard and mouse port redirection circuits 26(I) and 30(I). In addition, during initial power-up the console terminal 14 will, by means of a command directed to the maintenance network interface circuit 25(I) of the processing node 16(I) being initialized (which is provided thereto in messages provided by the processing node 16(M), enable the maintenance network interface circuit (I) to retrieve video data from the video interface 22(I) through the video circuit 27(I) and provide it to the processing node 16(M) in messages transmitted over the maintenance network 14, which, in turn, will provide it to the console terminal in messages transmitted over networks 20(s) and 13(n) to the console terminal 14.

With this background, the operations performed by the console terminal 14 and the maintenance network interface circuits 25(m) in connection with providing console services to the processing nodes 16(m) will be described. Generally, the operator or system administrator uses the console terminal 14 to, in turn, enable the maintenance network interface circuit 25(m) of a processing node 16(m) to provide keystroke information and mouse position and movement information as well as mouse button depression and release information to the processing node's keyboard and mouse port interfaces 23(m) and 24(m), and in addition to enable the maintenance network interface circuit 25(m) to retrieve video information from the video interface 22(m) and provide it to the console terminal 14 for display in a window 42(w).

As noted above, communications between the console terminal 14 and a maintenance network interface circuit 25(m) are in the form of messages which are transferred over the maintenance network 15. The console terminal 14 may transmit a number of diverse types of messages to a maintenance network interface circuit 25(m), which may be divided into video, keyboard, and mouse classes each related to one of the three interfaces 22(m), 23(m) and 24(m), in addition to conventional log-on and log-off messages which enable the operator or system manager to establish a session with the maintenance network interface circuit 25(m). During a session, that is, after receiving a suitable log-on message, and prior to receiving a log-off message, the maintenance network interface circuit 25(m) will receive messages of the video, keyboard, and mouse classes from the console terminal 14 and will transmit messages of the video class to the console terminal. It will be appreciated that the console terminal 14 may have sessions with maintenance network interface circuits 25(m) of a number of processing nodes 16(m) concurrently, and perform system management operations in connection therewith concurrently through separate windows 42(w).

There are a number of types of messages which may be transferred between the console terminal and a maintenance network interface circuit in the video message class, including an "initialize region" type, a "send video changes" , a "stop sending video" type, a "video data" type and a "no video data" type. The console terminal 14 will send a message of the "send video changes" type, which specifies a timing interval. After receiving a message of the "send video changes" type from the console terminal 14, the maintenance network interface circuit 25(m), at regular intervals corresponding to the timing interval, will either return a message of the "video data" type which identifies video display regions for which display data has changed since the last such message, along with the updated or changed display data, which may be in ASCII form or in bit-mapped graphical form depending on the form of information provided by the video interface 22(m). Alternatively, the maintenance network interface circuit 25(m) may transmit a message of the "no video data" type if there have been no changes since the last message of the "video data" type. The console terminal 14 send a message of the "stop sending video" type to cause the maintenance network interface circuit 25(m) to stop sending "video data" messages. In addition, the console terminal 14 may provide a message of the "initialize region" type to initialize a display region, in which case the maintenance network interface circuit 25(m) will recognize the entire region as containing updated or changed video data, and so it will send video data for the entire region in the next message of the "video data" type.

In one embodiment, the console terminal 14 makes use of two types of messages of the keyboard class, namely, a "key down" type and a "key-up" type. The console terminal 14 transmits a message of the "key-down" type in response to depression of a key on the console terminal's keyboard 40, and a message of the "key-up" type when the key is released. It will be appreciated that the console terminal 14 will preferably transmit messages of the "key-down" and "key-up" types for various depression and release of keys of the console terminal's keyboard 40 in the order in which the keyboard events are received by the console terminal's processing circuits from its keyboard 40. Accordingly, if an operator or system manager depresses two or more keys on the console terminal's keyboard 40 before releasing any of them the console terminal 14 will transmit several messages of the "key-down" type, one message for each of the depressed keys. As the operator or system manager releases each key, the console terminal 14 will transmit a message of the "key-up" type. If the operator or system manager, before releasing all the other keys, then depresses a key, the console will transmit a message of the "key-down" type for the newly depressed key prior to sending messages of the "key-up"0 type for the last keys to be released.

In that same embodiment, the console terminal 14 makes use of two types of messages of the "mouse" class, including a "mouse move" message type and a "mouse action" message type. When the operator or system manager moves the console terminal's mouse 41, the console terminal 14 transmits a message of the "mouse move" type to indicate the new or current position of the mouse when the message was generated. A message of the "mouse move" type also includes a number of flags whose condition (set or cleared) indicates whether the mouse buttons were depressed and also whether certain keys on the console terminal's keyboard 40, whose state determines the activity to be performed by the processing node 16($m$) in response to a mouse move, were depressed during the mouse move. In one embodiment, in which the processing nodes 16($m$) comprise personal computer modules as described above, the flags indicate the condition of the CTRL ("control") and SHIFT keys of the keyboard 40, since their conditions can affect the activity to be performed by the processing node 16($m$) in response to a mouse move. A message of the "mouse action" type more generally indicates that the mouse's status has changed, including its position and the "click" status of the mouse buttons. A message of the "mouse action" type will identify the position of the mouse when the message is generated, as well as indicating whether a button is depressed, released or has been "double-clicked." A message of the "mouse action" type will also include flags similar to those in a message of the "mouse move" type.

As noted above, the console terminal 14 may have sessions with maintenance network interface circuits 25($m$) of a number of processing nodes 16($m$) concurrently, and perform system management operations in connection therewith concurrently through associated windows 42($w$), one of which will be active at any point in time. The console terminal 14 will generally transmit messages addressed to the maintenance network interface circuit 25($m$) which is associated with the active window 42($w$). In that manner, keystroke information and mouse movement and action information will be provided, through the maintenance network interface circuit 25($m$), to the processing node 25($m$) that is associated with the active window 42($w$). In addition, the video access control information will be provided, to the maintenance network interface circuit 25($m$) that is associated with the active window 42($w$). All of the maintenance network interface circuits 25($m$) with which the console terminal 14 has established sessions and enabled to access and provide video information, even those which are not associated with the active window, will, by messages of the "video data" and "no video data" type, provide video information to the console terminal 14, which will display the video information on the video display 42 in the window 42($w$) associated with the processing node 16($m$).

After establishing a session with a maintenance network interface circuit 25($m$), the operator or system administrator will normally initially enable the console terminal 14 to generate messages of the video message class to enable the maintenance network interface circuit 25($m$) to periodically retrieve video information from the processing node's video interface 22($m$) and provide it to the console terminal 14, thereby to provide the operator or system administrator with the video data output from the processing node 16($m$). Thereafter, the operator or system administrator may use the console terminal 14 initiate system management and other operations in connection with processing node 16($m$) through the maintenance network interface circuit 25($m$), using the console terminal 14 to initiate operations that he or she could initiate if the console terminal's keyboard 40, mouse 41 and video display 42 were connected directly to the processing node's video, keyboard and mouse port interfaces 22($m$), 23($m$) and 24($m$). As an illustration, the operator or system manager may use the console terminal 14 to re-initialize a processing node 16($m$) after the node is powered up. In a re-initialization operation, the operator or system administrator may enter a predetermined keystroke combination (which, in the case of the Microsoft MS-DOS and Microsoft Windows™ operating system programs is the concurrent depression of the "CTRL," "ALT," and "DEL" keys), which is supplied as keystroke information in messages of the "key-down" type which are transmitted by the console terminal 14 to the maintenance network interface circuit 25($m$). The maintenance network interface circuit 25($m$), in turn, supplies the keystroke information to the keyboard interface 23($m$) and, when the processor 21($m$) determines that the predetermined keystroke combination has been provided, it will re-initialize the processing node 16($m$) in the same manner as if the console terminal's keyboard 40 were connected to the keyboard interface 23($m$).

Similarly, as noted above, operating parameters for each processing node 16($m$) are established by establishing initialization scripts to be processed by the processing node 16($m$) to enable the processing node to execute selected node "system configuration" commands, load selected device drivers and the like. In the Microsoft MS-DOS and Microsoft Windows™ operating system programs, the initialization scripts and configuration information for each processing node 16($m$) are in the form of files which are local to the processing node 16($m$), which the processing node automatically accesses during initialization. The operator or system administrator may, in a conventional manner, enter sequences of keystrokes through the console terminal's keyboard 40 and manipulate the mouse 41, in response to which the console terminal 14 generates sequences of messages of the keyboard and mouse classes as described above to transmit keystroke information and mouse information to the maintenance network interface circuit 25($m$). The maintenance network interface circuit 25($m$), in turn, provides the keyboard and mouse action information to the processing node's keyboard interface 23($m$) and mouse port interface 24($m$), in response to which the processing node 16($m$) may be enabled to create and store the initialization script and configuration information files in the same manner as if the console terminal's keyboard 40 and mouse 41 were connected to the keyboard and mouse port interfaces 23($m$) and 24($m$).

In addition, if the processing node 16($m$) is running various types of programs, such as applications programs, which recognize input information which would be provided by a keyboard or mouse if they were connected to the keyboard interface 23($m$) or mouse port interface 24($m$), depending on the keystroke information and mouse information that is provided through the console terminal 14 and maintenance network interface circuit 25($m$), the processing node 16($m$) may be enabled to provide the keystroke and mouse information provided by the operator or system administrator to an applications program. Thus, for example, the operator or system administrator may enter an appropriate keystroke sequence using the keyboard 40 and/or manipulate the mouse 41, in response to which the console terminal 14 will transmit appropriate messages of the "keyboard" and "mouse" classes to the maintenance network interface circuit 25($m$) of the processing node 16($m$) to run the program. The maintenance network interface circuit 25($m$), in turn, provides the keyboard and mouse action information to the processing node's keyboard interface 23($m$) and mouse port interface 24($m$), in response to which the processing node 16($m$) may be enabled to initialize and run the applications program in the same manner as if the console terminal's keyboard 40 and mouse 41 were connected to the keyboard and mouse port interfaces 23($m$) and 24($m$).

At some point, the operator or system administrator may decide to terminate a system management session in connection with a particular processing node 16(m). At that point, he or she may enable the console terminal 14 to generate a log-off message and transmit it to the processing node's maintenance network interface circuit 25(m). Following receipt of the log-off message, the maintenance network interface circuit 25(m) will not respond to further messages from the console terminal 14 until it receives a subsequently-transmitted log-on message to initiate another session. It will be appreciated that the processing node 16(m) will, however, continue to respond to processing and storage requests that it receives from a user terminal 12(d) over the network 20(A) or 20(B).

The processor 31(m) of a processing node 16(m) may, after being initialized by the console terminal 14 as described above, perform operations similar to those described above in connection with messages of the various video, keyboard, and mouse classes as described above after the processing node 16(m) has been initialized.

The invention provides a number of advantages. In particular it facilitates the system management of each of a number of processing nodes 16(m) in a fault-tolerant computer system 11 from a single terminal 14, with the processing nodes of the fault-tolerant computer system 11 being conventional modules that expect to receive particular predetermined types of operator inputs (in particular, provided by a keyboard and mouse) and that generate particular types of video output information.

It will be appreciated that numerous modifications may be made to the system 10 depicted in FIG. 1. For example, the networks 13(A), 13(B), 20(A), 20(B) and the maintenance network 15, which have been described as being Ethernets, may comprise other types of networks. In addition, while the maintenance network interface circuit 25(m) has been described as comprising an Server Monitor Module sold by Intel Corporation, the circuit 25(m) may comprise any other conventional or custom-designed element which provides the interfacing as described above. Furthermore, the processing nodes 16(m), which have been described as comprising personal computer "motherboard" modules, may instead or in addition comprise other types of processing modules.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. For use in connection with a fault-tolerant computer system including a plurality of processing modules, at least some of said processing modules including an operator input interface adapted to receive operator input from an operator input device and operator display output adapted to generate display information for display on an operator display device, a console terminal arrangement for facilitating system management by an operator at a single location comprising:

A. a console terminal including an operator input device and an operator display device, the operator providing processing module management inputs thereby to enable said operator input device to generate processing module management information, the console terminal generating operator input messages including said processing module management information and an address identifying one of said processing modules to be managed by said console terminal, the console terminal further generating video image information in response to display information from display information messages received by said console terminal from said processing module to be managed by said console terminal;

B. a plurality of processing module interfaces each connected to a respective one of said processing modules, each processing module interface:
   i. (a) receiving operator input messages generated by said console terminal which include an address identifying the processing module connected to the processing module interface and (b) providing the processing module management information from the received operator input messages to the operator input interface of the respective processing module to thereby facilitate control of the respective processing module;
   ii. (a) receiving display information from the operator output device of the respective processing module and (b) generating a message including the display information and an address identifying the console terminal; and C. a console network interconnecting said console terminal and all of said processing module interfaces for carrying said messages generated by said console terminal and said processing module interfaces thereamong in accordance with the addresses contained in the respective messages.

2. A console terminal as defined in claim 1 in which each processing module further comprises a user network interface connected to a user network, the console terminal:

A. first initializing a first initialized one of said processing modules in connection with initialization messages transferred to the one of said processing module interfaces associated with said first initialized one of said processing modules over said console network, said one of said processing module interfaces associated with said first initialized one of said processing modules initializing said first initialized one of said processing modules, and B. thereafter initializing others of said processing modules in connection with messages transferred to said first initialized one of said processing modules over said user network, the first initialized one of said processing modules enabling its processing module interface to transfer initialization messages over said console network to said processing module interfaces of said others of said processing modules thereby to initialize said others of said processing modules.

3. A console terminal as defined in claim 1, at least one of said processing modules including a plurality of types of operator input interfaces, said console terminal generating a plurality of classes of operator input messages each associated one of said types of operator input interfaces, said processing module interface of said at least one processing module receiving said operator input messages and coupling operator input information therein to a particular one of said plurality of operator input interfaces in response to the class of said operator input message.

4. A console terminal as defined in claim 3 in which:
   (i) the console terminal includes a keyboard operator input device, (ii) one of said types of operator input interfaces is a keyboard interface, and (iii) one of said classes of operator input messages is a keyboard input message class, A. the console terminal generating an operator input message of the keyboard input message class in response to operator input through the console terminal's keyboard operator input device, and B. the processing module interface of said at least one processing module receiving the operator input messages and, for such operator input messages of the keyboard input message class, coupling operator input information therein to said keyboard interface.

5. A console terminal as defined in claim 4 in which the console terminal generates a plurality of types of operator input messages of the keyboard input message class, including a key-down type and a key-up type, the console terminal generating an operator input message of the key-down type in response to depression of a key of said keyboard operator input device, and an operator input message of the key-up type in response to release of a depressed key of said keyboard operator input device.

6. A console terminal as defined in claim 3 in which:

(i) the console terminal includes a mouse operator input device, (ii) one of said types of operator input interfaces is a mouse interface, and (iii) one of said classes of operator input messages is a mouse input message class, A. the console terminal generating an operator input message of the mouse input message class in response to operator input through the console terminal's mouse operator input device, and B. the processing module interface of said at least one processing module receiving the operator input messages and, for such operator input messages of the mouse input message class, coupling operator input information therein to said mouse interface.

7. A console terminal as defined in claim 6 in which the console terminal generates a plurality of types of operator input messages of the mouse input message class, including a mouse-move type and a mouse-action type, the console terminal generating an operator input message of the mouse-move type in response to movement of said mouse operator input device, and an operator input message of the key-up type in response to depression of a button of said mouse operator input device.

8. A console terminal as defined in claim 1 in which each said processing module interface receives display information from the operator output device of the respective processing module and generates messages including the display information for transfer to the console terminal in response to display information retrieval commands therefor in display information retrieval command messages received thereby from said console terminal.

9. A console terminal as defined in claim 8 in which one type of display information retrieval command is an initialization command type, each said processing module interface responding to a display information retrieval command of the initialization command type by retrieving display data from an entire display region provided by the operator output interface of the processing module associated with the processing module interface for transfer to said console terminal.

10. A console terminal as defined in claim 8 in which one type of display information retrieval command is a send-changes type, each said processing module interface responding to a display information retrieval command of the send-changes type by periodically retrieving changes to the display data provided by the operator output interface of the processing module associated with the processing module interface for transfer to said console terminal.

11. A console terminal as defined in claim 10 in which a display information retrieval command of the send-changes type includes time interval information, each processing module interface retrieving said changes at the end of successive time intervals defined by said time interval information for transfer to said console terminal.

12. A console terminal as defined in claim 11 in which one type of display information retrieval command is a stop sending type, each processing module interface responding to a display information retrieval command of the stop sending type by terminating retrieval of said changes at the end of successive time intervals defined by said time interval information for transfer to said console terminal.

13. A fault-tolerant computer system including:

A. a plurality of processing modules each including an operator input interface for receiving operator input from an operator input device and operator display output for generating on an operator display device;

B. a console terminal for facilitating system management by an operator at a single location, said console terminal including an operator input device and an operator display device, the operator providing processing module management inputs thereby to enable said operator input device to generate processing module management information, the console terminal generating operator input messages including said processing module management information and an address identifying one of said processing modules to be managed by said console terminal, the console terminal further generating video image information in response to video image data from video information messages received by said console terminal from said processing module to be managed by said console terminal;

C. a plurality of processing module interfaces each connected to a respective one of said processing modules, each processing module interface:

(i) (a) receiving operator input messages generated by said console terminal which include an address identifying the processing module connected to the processing module interface and (b) providing the processing module management information from the received operator input messages to the operator input interface of the respective processing module to thereby facilitate control of the respective processing module;

(ii) (a) receiving video information from the operator output device of the respective processing module and (b) generating a message including the video information and an address identifying the console terminal; and D. a console network interconnecting said console terminal and all of said processing module interfaces for carrying said messages generated by said console terminal and said processing module interfaces thereamong in accordance with the addresses contained in the respective messages.

14. A fault tolerant computer system as defined in claim 13 in which each processing module further comprises a user network interface, said system further comprising at least one user terminal interconnected with said user network interfaces by a user network, the user terminal being used by a user to generate messages for transfer over said user network to selected ones of said processing modules to control said selected ones of said processing modules in performing user processing operations.

15. A fault tolerant computer system as defined in claim 14 in which said user terminal receives from said selected ones of said processing modules display data over said user network for display to a said user.

16. A fault tolerant computer system as defined in claim 14 in which said system comprises a plurality of said user terminals all of which are connected to said user network, each user terminal being usable by a user to generate messages for transfer over said user network to selected ones of said processing modules to control said selected ones of said processing modules in performing user processing operations.

17. A fault tolerant computer system as defined in claim 16 in which said user terminals receive from said selected ones of said processing modules display data over said user network for display to a said user.

18. A fault tolerant computer system as defined in claim 14 in which said console terminal is further connected to said user network, the console terminal:

A. first initializing a first initialized one of said processing modules in connection with initialization messages transferred to the one of said processing module interfaces associated with said first initialized one of said processing modules over said console network, said one of said processing module interfaces associated with said first initialized one of said processing modules initializing said first initialized one of said processing modules, and B. thereafter initializing others of said processing modules in connection with messages transferred to said first initialized one of said processing modules over said user network, the first initialized one of said processing modules enabling its processing module interface to transfer initialization messages over said console network to said processing module interfaces of said others of said processing modules thereby to initialize said others of said processing modules.

19. A fault-tolerant computer system including:

A. a plurality of processing module sections each comprising at least one processing module each including an operator input interface for receiving operator input from an operator input device and operator display output for generating on an operator display device, each processing module further comprises a user network interface;

B. each processing module section being associated with at least one user terminal interconnected with the user network interface of said at least one processing module of its associated processing module section by a respective user network, the user terminal being used by a user to generate messages for transfer over said user network to said at least one processing module of its associated processing module section to control said at least one processing module of its associated processing module section in performing user processing operations;

C. a switch for interconnecting the user networks associated with said respective processing module sections;

D. a console terminal for facilitating system management by an operator at a single location, said console terminal including an operator input device and an operator display device, the operator providing processing module management inputs thereby to enable said operator input device to generate processing module management information, the console terminal generating operator input messages including said processing module management information and an address identifying one of said processing modules to be managed by said console terminal, the console terminal further generating video image information in response to video image data from video information messages received by said console terminal from said processing module to be managed by said console terminal;

E. a plurality of processing module interfaces each connected to a respective one of said processing modules, each processing module interface:
  i. (a) receiving operator input messages generated by said console terminal which include an address identifying the processing module connected to the processing module interface and (b) providing the processing module management information from the received operator input messages to the operator input interface of the respective processing module to thereby facilitate control of the respective processing module;
  ii. (a) receiving video information from the operator output device of the respective processing module and (b) generating a message including the video information and an address identifying the console terminal; and F. a console network interconnecting said console terminal and all of said processing module interfaces for carrying said messages generated by said console terminal and said processing module interfaces thereamong in accordance with the addresses contained in the respective messages.

20. A fault tolerant computer system as defined in claim 19 in which said console terminal is further connected to at least one of said user networks, the console terminal:

A. first initializing a first initialized one of said processing modules in connection with initialization messages transferred to the one of said processing module interfaces associated with said first initialized one of said processing modules over said console network, said one of said processing module interfaces associated with said first initialized one of said processing modules initializing said first initialized one of said processing modules, and B. thereafter initializing others of said processing modules in connection with messages transferred to said first initialized one of said processing modules over said user network, the first initialized one of said processing modules enabling its processing module interface to transfer initialization messages over said console network to said processing module interfaces of said others of said processing modules thereby to initialize said others of said processing modules.

* * * * *